United States Patent
Sano

(10) Patent No.: US 9,350,892 B2
(45) Date of Patent: May 24, 2016

(54) IMAGE PROCESSING APPARATUS AND IMAGE PROCESSING METHOD

(71) Applicant: CANON KABUSHIKI KAISHA, Tokyo (JP)

(72) Inventor: Shinji Sano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/627,195

(22) Filed: Feb. 20, 2015

(65) Prior Publication Data

US 2015/0256702 A1    Sep. 10, 2015

(30) Foreign Application Priority Data

Mar. 5, 2014   (JP) .................................. 2014-043156

(51) Int. Cl.
| | |
|---|---|
| *H04N 1/407* | (2006.01) |
| *H04N 1/024* | (2006.01) |
| *H04N 1/00* | (2006.01) |
| *G06T 5/00* | (2006.01) |
| *G06T 3/00* | (2006.01) |

(52) U.S. Cl.
CPC .......... *H04N 1/02481* (2013.01); *G06T 3/0093* (2013.01); *G06T 5/006* (2013.01); *H04N 1/00005* (2013.01); *H04N 1/00013* (2013.01); *H04N 1/00045* (2013.01); *H04N 1/00087* (2013.01); *H04N 1/02409* (2013.01)

(58) Field of Classification Search
None
See application file for complete search history.

(56) References Cited

U.S. PATENT DOCUMENTS

| | | | | |
|---|---|---|---|---|
| 7,602,995 | B2 * | 10/2009 | Araki ................... | G06K 9/3283 358/3.26 |
| 7,697,776 | B2 * | 4/2010 | Wu ....................... | G06K 9/3283 358/3.27 |
| 8,159,721 | B2 * | 4/2012 | Lee ....................... | G06K 9/3283 358/3.26 |
| 2006/0193533 | A1 * | 8/2006 | Araki ................... | G06K 9/3283 382/275 |
| 2014/0226915 | A1 * | 8/2014 | Fujita ..................... | H04N 5/217 382/264 |

FOREIGN PATENT DOCUMENTS

JP    11-353473 A    12/1999

* cited by examiner

*Primary Examiner* — Dung Tran
(74) *Attorney, Agent, or Firm* — Fitzpatrick, Cella, Harper & Scinto

(57) ABSTRACT

An image processing apparatus processes image data configured of pixels disposed in grid form. The apparatus includes an obtaining unit that obtains distortion characteristics indicating characteristics of distortion in a target contained in original image data obtained by capturing an image of the target, and a correction unit that, using a sampling function, interpolates a pixel of interest in the original image data, based on pixels of the original image data present in a reference region in the periphery of the location of the pixel of interest. The correction unit changes the range of the reference region, the frequency characteristics of the sampling function, or both in accordance with the distortion characteristics.

10 Claims, 12 Drawing Sheets

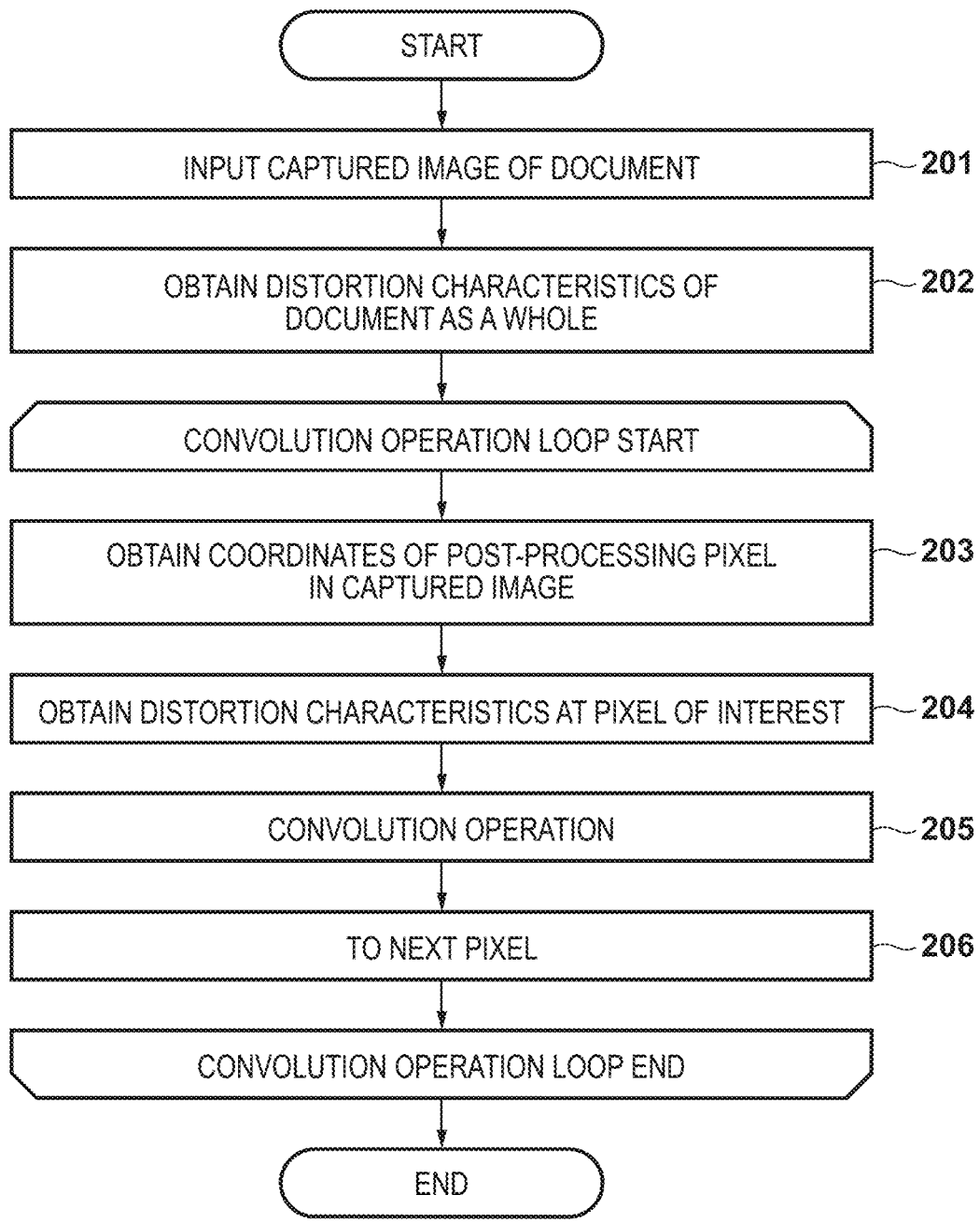

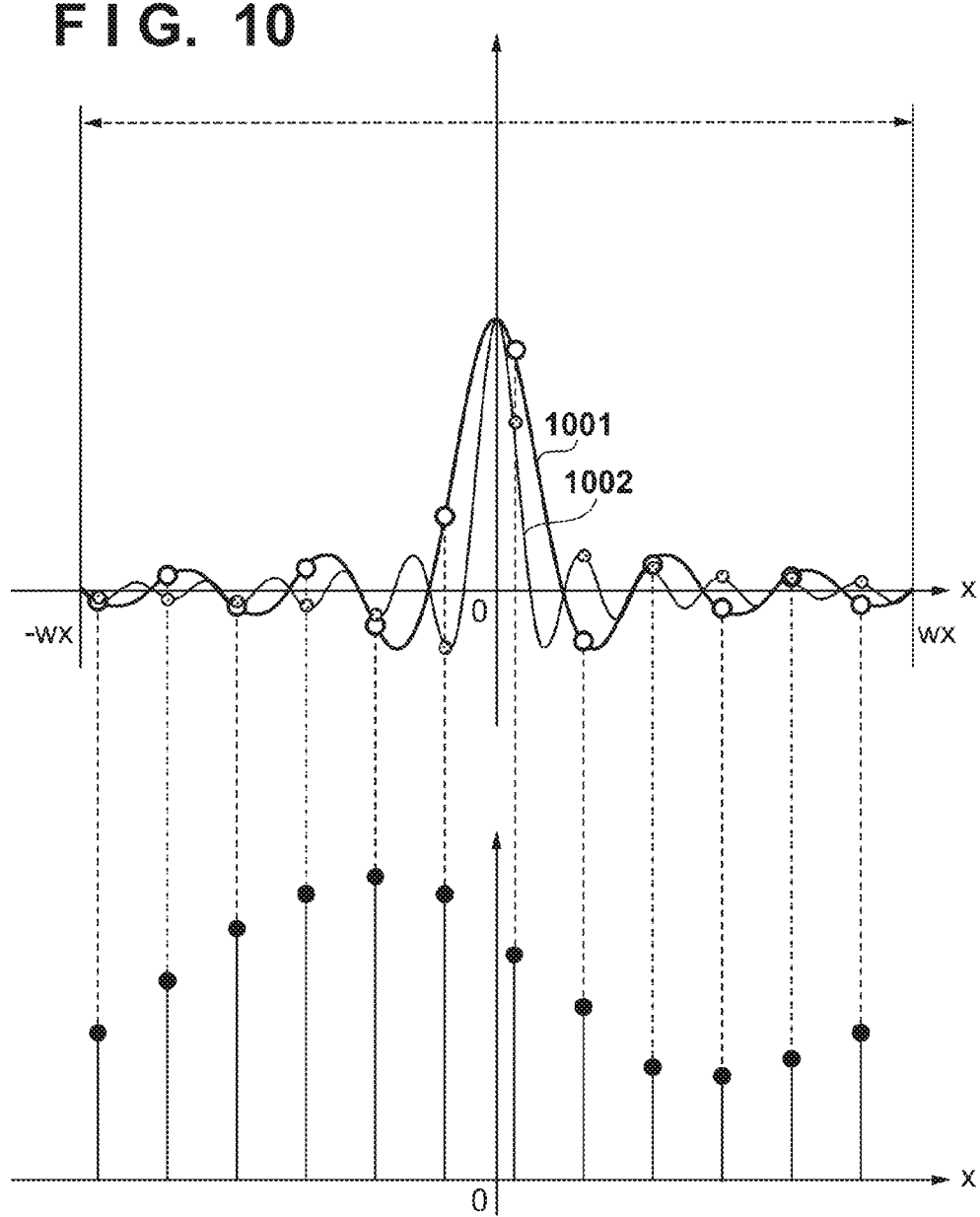

| VALUE OF cosθx | ONE PERIOD OF SAMPLING FUNCTION |
|---|---|
| 3/4 < cosθx ≤ 1 | wx/3 |
| 1/2 < cosθx ≤ 3/4 | wx/4 |
| 1/4 < cosθx ≤ 1/2 | wx/6 |
| 0 ≤ cosθx ≤ 1/4 | wx/12 |

IMAGE PROCESSING APPARATUS AND IMAGE PROCESSING METHOD

BACKGROUND OF THE INVENTION

1. Field of the Invention

The present invention relates to image processing apparatuses and image processing methods that carry out image processing on an image.

2. Description of the Related Art

Image reading apparatuses that obtain image data by capturing an image of a document on a document platform from directly above or at an angle from above using an image capturing unit such as a camera, a scanner, or the like have been known for some time, as represented by document cameras. However, distortion occurs in the read image when the distance from the image capturing unit is not constant, and thus it is necessary to correct the distortion. To obtain post-distortion correction process pixel values for given pixels in such a distortion correction process, it is necessary to obtain relative post-distortion correction process coordinates of the pixel in the pre-correction process image, as well as carrying out an interpolation process that finds grid point pixel values from non-integer coordinate pixels (that is, non-grid point pixels) that have coordinate components below a decimal point and are thus not integer coordinates (coordinates whose coordinate components are expressed as integers; also called grid points) found as a result of obtaining the relative coordinates. The nearest neighbor method, which substitutes the pixel values from the nearest pixels, is an example of such an interpolation method. However, this method is problematic in that jaggies, line dropouts, and so on will arise. Accordingly, a technique is known in which a convolution operation is carried out by using a sampling function and referring to the pixel values of a plurality of pixels within a limited region in the periphery of the given pixel, and estimating the pixel value at those coordinates (see, for example, Japanese Patent Laid-Open No. 11-353473).

With this interpolation process that uses a convolution operation, the image quality that is achieved will differ depending on the breadth of the region subjected to convolution, the frequency characteristics of the sampling function that is used, and so on. In other words, generally speaking, a broader reference region relative to the pre-processing image or a lower frequency for the sampling function results in a greater smoothing effect being produced on the original image and less jaggies in edge areas. Conversely, a narrower reference region relative to the pre-processing image or a higher frequency of the sampling function results in a greater sharpening effect being produced on the pre-processing image and more jaggies in edge areas.

Meanwhile, when a non-planar document is placed on a document platform and captured by a camera located directly thereabove, the tilt of the document relative to the document platform, or in other words, the angle relative to the optical axis of the camera's optical system, will differ from location to location in the document, and thus there is a property that the frequency characteristics of content printed on the document differ from location to location. In other words, in the case where a booklet having a degree of thickness, such as a magazine or a dictionary, is placed in an open state on the document platform with its pages facing upward, a region near the binding between the pages will appear to have a higher frequency component from the viewpoint of the camera as compared to a region near the center of each page, even if the frequency components are the same when the pages are printed. Meanwhile, even if the tilt of the document relative to the document platform is constant, the captured image may distort in, for example, a barrel shape due to optical distortion present in the camera's optical system itself. In this case, even if the frequency characteristics are uniform throughout the plane when the document is printed, the frequency characteristics of the captured image will differ from location to location.

If the aforementioned interpolation process that employs a convolution operation using a sampling function is applied uniformly to an obtained image having such characteristics, the relative breadth of the reference region and the frequency characteristics will change depending on the location within the image. As a result, unevenness appears in the effect on the post-distortion correction process image. In other words, when carrying out an interpolation process on a captured image of a thick booklet document as mentioned earlier, even if a distortion correction process is applied uniformly, the sampling function will have a relatively high frequency in regions near the center of each page due to the image obtained at those regions having a low frequency, resulting in a sharp state, whereas the sampling function will have a relatively low frequency in regions near the binding due to the image obtained at those regions having a high frequency, resulting in a smoothed state.

SUMMARY OF THE INVENTION

The present invention provides an image processing apparatus and an image processing method capable of handling variations in spatial frequency occurring when a target is converted into image information, and obtaining a high-quality interpolation result.

According to the present invention, there is provided an image processing apparatus that processes image data configured of pixels disposed in grid form. The apparatus comprises an obtaining: unit that obtains distortion characteristics indicating characteristics of distortion in a target contained in original image data obtained by capturing an image of the target; and a correction unit that, using a sampling function, interpolates a pixel of interest in the original image data, based on pixels of the original image data present in a reference region in the periphery of the location of the pixel of interest. The correction unit changes a range of the reference region, frequency characteristics of the sampling function, or both in accordance with the distortion characteristics.

According to the present invention, it is possible to handle variations in spatial frequency occurring when a target is converted into image information and obtain a high-quality interpolation result. For example, when carrying out distortion correction, magnification processing, or the like on an image obtained from a non-planar document, or when carrying out distortion aberration correction, chromatic aberration correction, or the like caused by an optical system when converting a target into image information, a high-quality interpolation result that has no unevenness within the overall image can be obtained while carrying out highly-accurate interpolation processing.

Further features of the present invention will become apparent from the following description of exemplary embodiments (with reference to the attached drawings).

BRIEF DESCRIPTION OF THE DRAWINGS

FIG. 2 is an operational flow according to a first embodiment.

FIG. 9 is a diagram illustrating an example of discrete switching of the reference region.

FIG. 10 is a diagram illustrating a convolution operation employing a sampling function and a pixel value according to the second embodiment.

DESCRIPTION OF THE EMBODIMENTS

Hereinafter, embodiments of the present invention will be described with reference to the drawings. The following embodiments of the present invention describe an image reading apparatus that reads and digitizes an image of a document, including a non-planar document such as a booklet, that has been placed upon a document platform, and that carries out accompanying image processing; that is, the embodiments describe a document reader. However, the present invention is not limited thereto, and can be applied to all image reading apparatuses having functions including image processing related to image reading, such as photocopy functions, fax functions, and so on. The present invention can also be applied in image processing apparatuses that do not read images but carry out image correction on read images obtained through some sort of method, such as upconverters. Furthermore, the non-planar document of which an image is to be read is not limited to booklets, and the present invention can be applied in the case of documents aside from paper and three-dimensional objects, such as product packaging, plastic bottle labels, and so on.

First Embodiment

Figure 1:
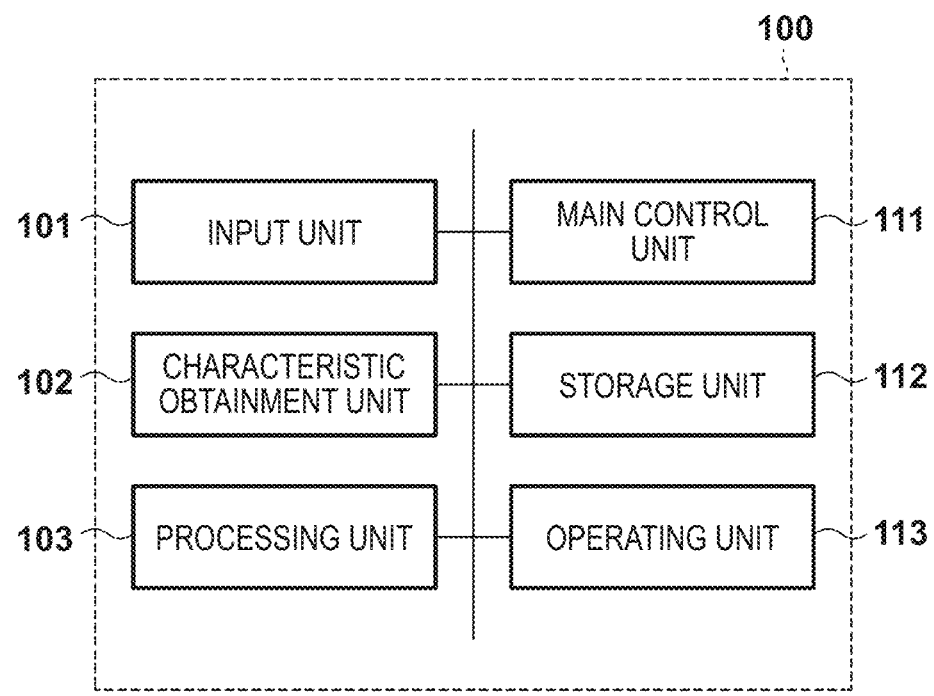
FIG. 1 is a block diagram illustrating an overall configuration.

The first embodiment describes, as an embodiment of an image processing apparatus according to the present invention, a document reader that captures an image using a camera and carries out a distortion correction process on the captured image. FIG. 1 is a block diagram illustrating a configuration according to the present embodiment. A document reader 100 according to the present embodiment includes a main control unit 111 that controls an image reading apparatus as a whole, a storage unit 112 that stores captured image data and accompanying information, and an operating unit 113 that receives commands from an operator. The document reader 100 further includes an input unit 101 that captures an image of a document and inputs resulting electronic image data, a characteristic obtainment unit 102 that obtains distortion characteristics of the document, and a processing unit 103 that carries out the distortion correction process on the captured image. The obtained electronic image data is configured so as to express an image using pixels disposed in grid form.

FIG. 2 illustrates a flow of operations according to the present embodiment. Descriptions will be given hereinafter using these diagrams.

In step 201, under the control of the main control unit 111, and in accordance with a command from the operator received through the operating unit 113, the input unit 101 captures an image of a document placed on the document platform and inputs a digitized captured image. The captured image is saved in the storage unit 112.

Figure 3A:
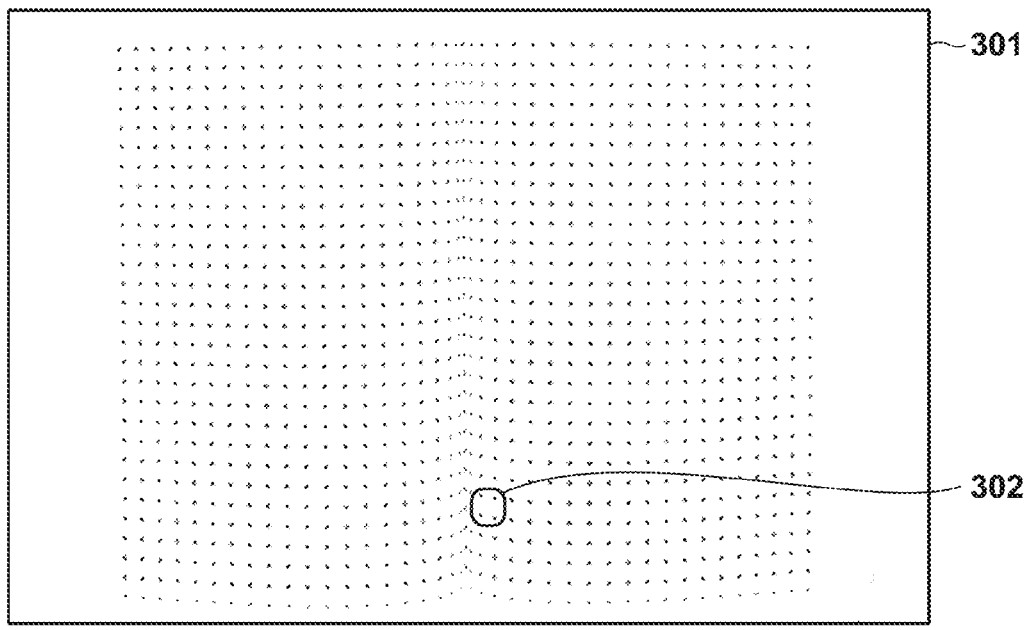
FIGS. 3A and 3B are diagrams illustrating distortion characteristics.
Figure 3B:
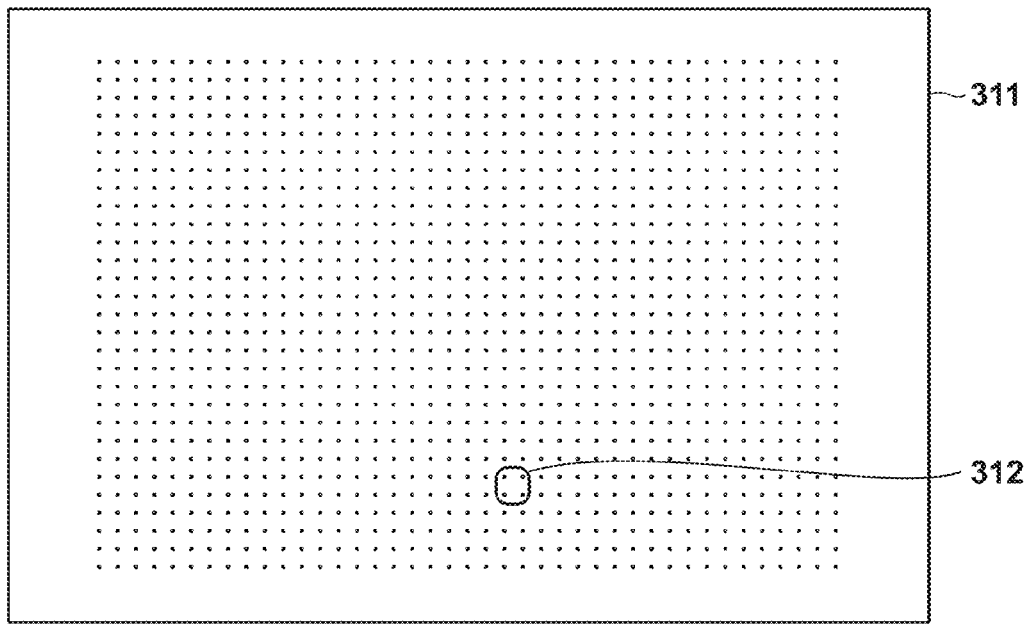

In step 202, under the control of the main control unit 111, the characteristic obtainment unit 102 obtains overall distortion characteristics of the document placed on the document platform. FIGS. 3A and 3B illustrate an example of the distortion characteristics. The distortion characteristics map where post-distortion correction process coordinates, or in other words, undistorted coordinates, are located in the input image in step 201. A variety of known techniques exist for obtaining these characteristics, such as a technique of obtaining using a stereo camera or a light-field camera, a technique of obtaining using a 3D mapping sensor, or a technique that directly projects a grid or a point sequence onto a non-planar document using a projector and then measures the shape thereof using a camera, but the present embodiment is not limited thereto. A method that saves the distortion characteristics as known information in the storage unit 112 in advance may be employed as well. With this method, in the case where there are a plurality of distortion characteristics saved in advance, characteristics selected therefrom are obtained in step 202.

Step 203 to step 206 represent a processing loop in which the processing unit 103 processes all of the pixels in the captured image under the control of the main control unit 111. The loop is repeated for all pixels in the processed image. The tapered blocks at the beginning and end of step 203 to step 206 indicate that step 203 to step 206 are repeated until all pixels of a post-interpolation process image are obtained.

Figure 4A:
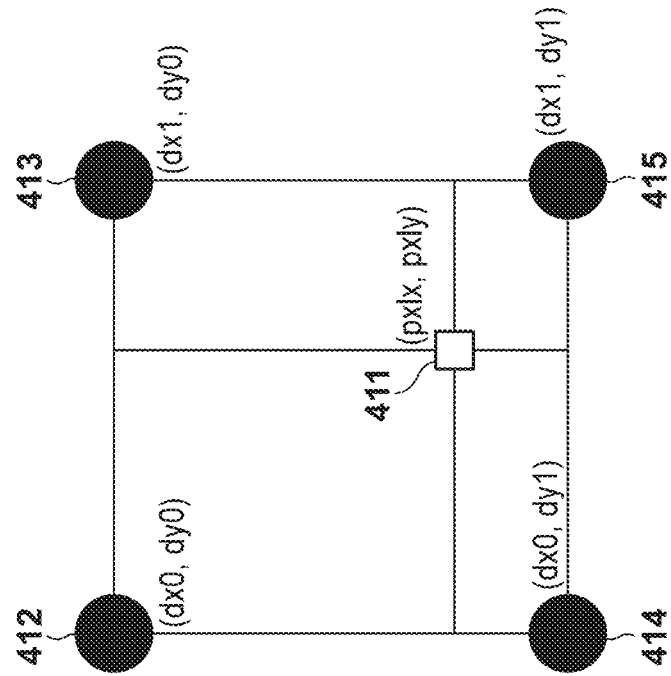
FIGS. 4A and 4B are diagrams illustrating grid points in distortion characteristics and a pixel of interest.
Figure 4B:
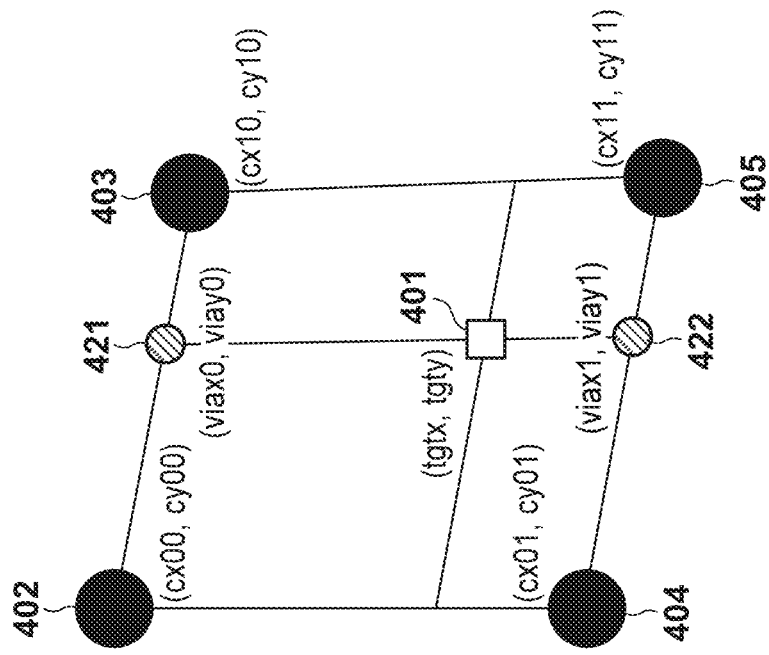

In step 203, corresponding coordinates, within the captured image, of a pixel of interest that is to be processed are calculated by referring to the distortion characteristics. FIG. 3A illustrates distortion characteristics 301 expressed as grid points, and FIG. 3B illustrates post-distortion correction process characteristics 311 that are undistorted. Of course, the characteristics 301 are merely one example. The characteristics 301 correspond to characteristics of a magazine, serving as the document, which has been placed on the document platform in an open state. In other words, the distortion correction can be realized by, for example, mapping each point in the characteristics 301 to respective points in the characteristics 311. Meanwhile, FIGS. 4A and 4B illustrate close-ups of a region 302 and a region 312 in particular. A pixel 411 is a pixel of interest to be interpolated, or in other words, is a pixel that is at a post-correction grid point and configures a post-correction image. Pixels 412 to 415 are pixels located in the vicinity (the periphery) of the pixel of interest 411 and are pixels at grid points used in the interpolation of the pixel of interest 411. Grid points in the distortion characteristics 301 corresponding to these pixels are a pixel 401 and pixels 402 to 405. In other words, an image having the distortion characteristics 301 is an image that has actually been captured, and the coordinates of the point 401 in that image serve as the coordinates of the pixel of interest to be calculated in step 203. In such a case, coordinates (tgtx, tgty) of the point 401 are obtained through a linear interpolation process using the following Formulas 1 to 6, from the coordinates of the pixel of interest 411, a positional relationship between four points 412 to 415 in the periphery of the post-correction process image and the pixel of interest 411, and the coordinates of four points 402 to 405 in the periphery of the pixel of interest in the captured image. The coordinates of each point are as shown in FIGS. 4A and 4B. Note that the coordinates may of course be calculated through another method as well. Here, (pxlx, pxly) represents the coordinates of the post-correction pixel of interest, (cx00, cy00) to (cx11, cy11) represent the coordinates of the peripheral pixels in the original image data, and (dx0, dy0) to (dx1, dy1) represent the coordinates of the peripheral pixels in the post-correction image.

$$viax0 = cx00 + (pxlx - dx0)(cx10 - cx00)/(dx1 - dx0) \quad \text{(Formula 1)}$$

$$viay0 = cy00 + (pxlx - dx0)(cy10 - cy00)/(dx1 - dx0) \quad \text{(Formula 2)}$$

$$viax1 = cx01 + (pxlx - dx1)(cx11 - cx01)/(dx1 - dx0) \quad \text{(Formula 3)}$$

$$viay1 = cy01 + (pxlx - dx1)(cy11 - cy01)/(dx1 - dx0) \quad \text{(Formula 4)}$$

$$tgtx = viax0 + (pxly - dy0)(viax1 - viax0)/(dy1 - dy0) \quad \text{(Formula 5)}$$

$$tgty = viay0 + (pxly - dy0)(viay1 - viay0)/(dy1 - dy0) \quad \text{(Formula 6)}$$

Figure 5:
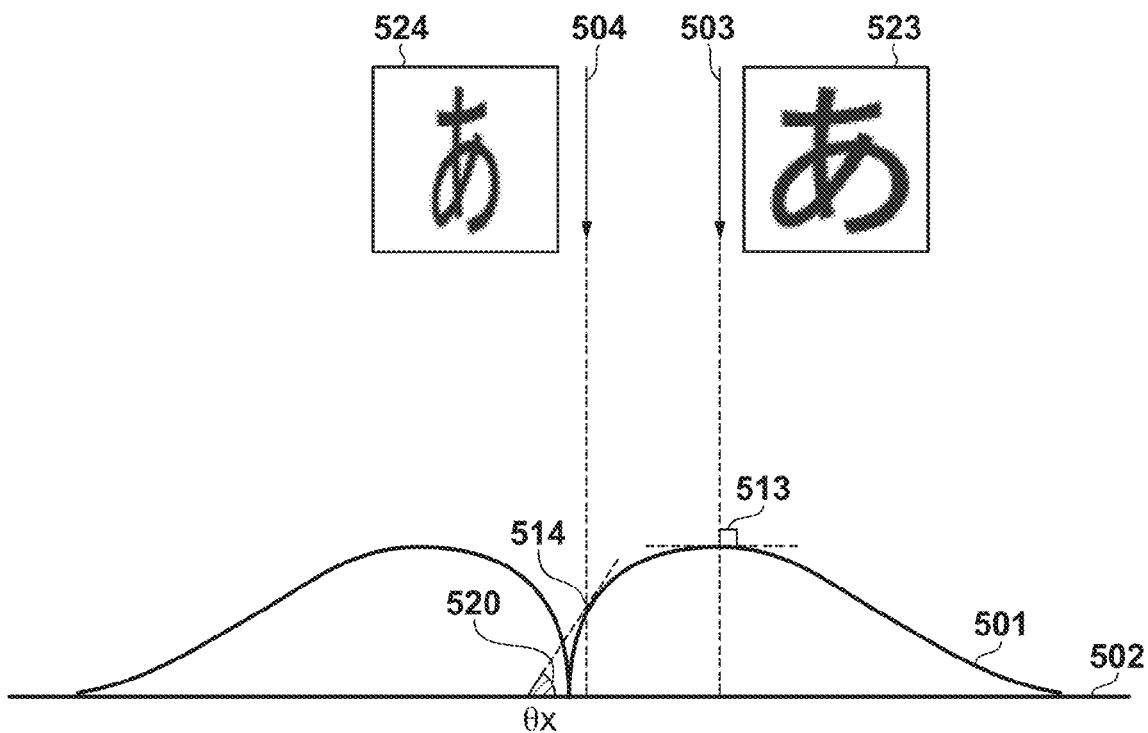
FIG. 5 is a diagram illustrating a cross-section of a document placed on a document platform.

In step 204, a tilt of the document relative to the document platform at the coordinates corresponding to the pixel of interest in the captured image is calculated by referring to the distortion characteristics. Note that it is assumed that the document platform is disposed parallel to a focal plane of an optical system of an image capturing device, and this tilt can also be referred to as a tilt relative to the focal plane. The tilt is not uniform, and differs locally, and thus the calculated tilt is a tilt of the pixel of interest to be corrected or a tilt in the vicinity thereof. Meanwhile, in the case where the distortion characteristics are provided as, for example, a tilt in the target from location to location, the tilt can be specified as a function of a location within the image. FIG. 5 is a cross-sectional view of the document placed on the document platform, seen from the side. Here, it is assumed that optical axes 503 and 504 of a camera's optical system face in a direction perpendicular to a document platform 502 on which a booklet 501 has been placed, regardless of the location on the document platform 502. In this case, the page is parallel to the document platform near a region 513 and an image such as that indicated by 523 is obtained, whereas the page has a tilt of a degree 520 relative to the document platform near a region 514 and an image such as that indicated by 524 is obtained. Focusing on the region 514, in the case where distortion characteristics such as those in FIGS. 4A and 4B have been obtained, an approximate cosine value is obtained through Formulas 7 and 8, from the coordinates of the points 402 to 405 and the coordinates of the points 412 to 415. In other words, assuming that the document has a tilt relative to the document platform represented by a horizontal direction θx and a vertical direction θy, the following hold true:

$$\cos \theta x = (cx10 + cx11 - cx00 - cx01)/(2(dx1 - dx0)) \quad \text{(Formula 7)}$$

$$\cos \theta y = (cy10 + cy11 - cy00 - cy01)/(2(dy1 - dy0)) \quad \text{(Formula 8)}$$

In step 205, a convolution operation is carried out using the coordinates calculated in step 203 and the cosine value of the tilt calculated in step 204. That is, when, in a coordinate system that takes the pixel of interest as its origin, a sampling function is represented by sin cx(x), sin cy(y), a constant expressing the breadth of a convolution operation region is represented by wx, wy, a constant indicating frequency characteristics of the sampling function is represented by fx, fy, and a pixel value of a pixel in the periphery of the pixel of interest in the captured image is represented by pxlval(x, y), a pixel value tgtval of the pixel of interest is obtained through Formula 9. The calculated pixel value is saved in the storage unit 112. Note that wx and wy, which express the breadth of the region, are infinite in terms of convolution operation theory, but because the processing cannot be practically executed as such, the region is assigned a limited breadth. Meanwhile, the sampling function is expressed as Formulas 10 and 11.

$$tgtval = \int_{-wy \cdot \cos\theta y}^{wy \cdot \cos\theta y} \sin cy(fy \cdot u) \cdot \left( \int_{-wx \cdot \cos\theta x}^{wx \cdot \cos\theta x} \sin cx(fx \cdot t) \cdot pxlval(t, u) dt \right) du \quad \text{(Formula 9)}$$

$$\sin cx(x) = \sin(nx)/nx \quad \text{(Formula 10)}$$

$$\sin cy(y) = \sin(ny)/ny \quad \text{(Formula 11)}$$

Figure 6:
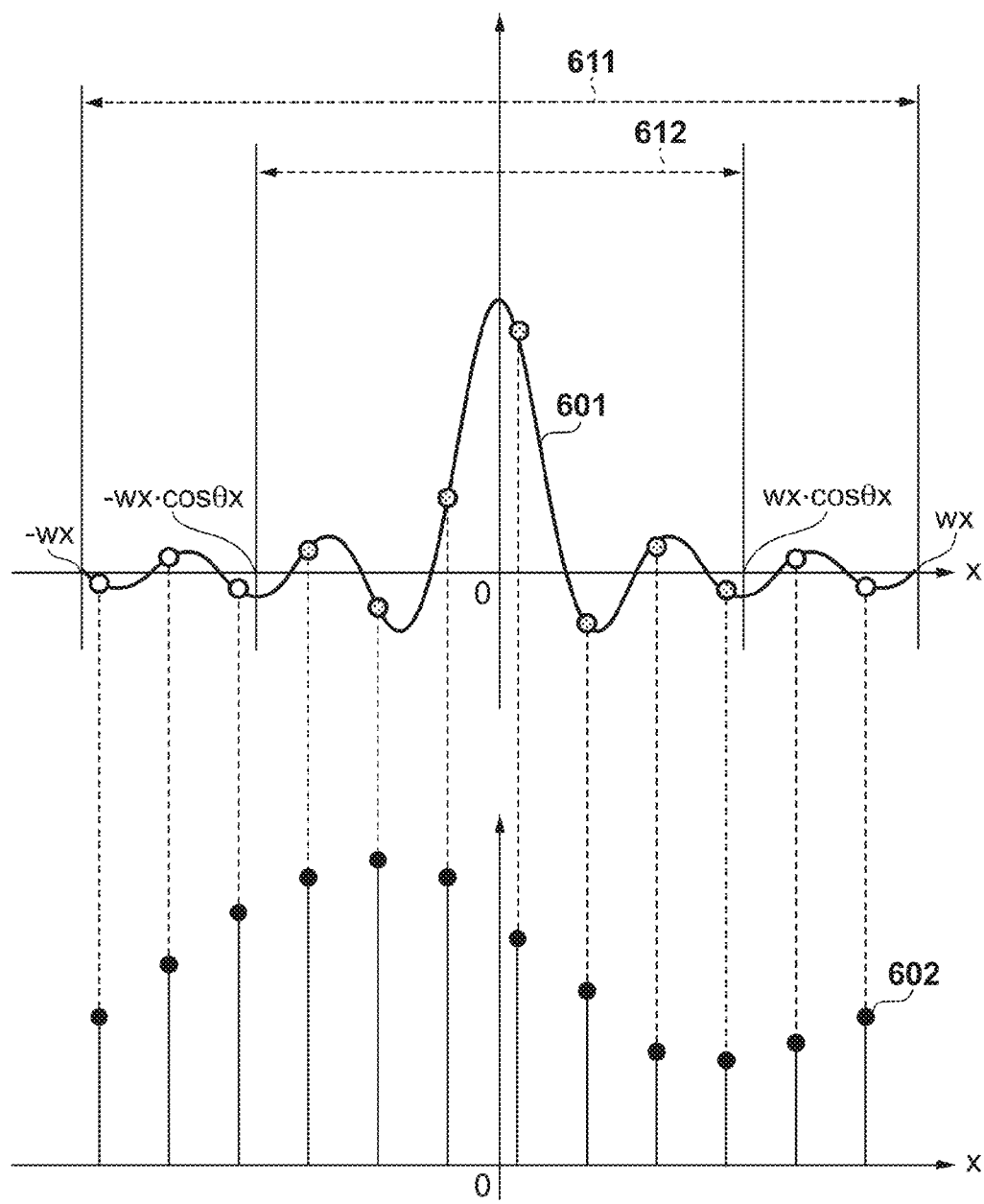
FIG. 6 is a diagram illustrating a convolution operation employing a sampling function and a pixel value according to the first embodiment.

FIG. 6 is a diagram in which the convolution operation has been limited to one dimension, namely an x-axis component, for descriptive purposes. In other words, FIG. 6 shows a convolution operation being carried out using a sampling function sin cx (601) for the x-axis component and a pixel value pxlval (602) of a discrete integer pixel. At this time, a pixel value tgtvalx(y) is obtained as indicated by Formula 12.

$$tgtvalx(y) = \int_{-wx \cdot \cos\theta x}^{wx \cdot \cos\theta x} \sin cx(fx \cdot t) \cdot pxlval(t, y) dt \quad \text{(Formula 12)}$$

What should be focused on here is that wx, which indicates the breadth of the region subject to the convolution operation, is being multiplied by the cos θx obtained from the tilt of the document. That is, if the region is one in which the document is parallel to the document platform (perpendicular to the camera's optical system), such as the region 513, the convolution operation refers to the region −wx to wx (611) as per the constant, whereas when there is a tilt, such as in the region 514, the reference region is narrowed as indicated by wx·cos θx to wx·cos θx (612). This indicates that the reference region has been tilted according to the target, or in other words, according to the tilt of the document, as with the region 514 in FIG. 5, and is projected onto the document platform (that is, the focal plane). In the case of FIG. 6, it can be seen that a convolution of 12 integer pixels in the vicinity of a central pixel has dropped to 7 pixels.

Figure 7:
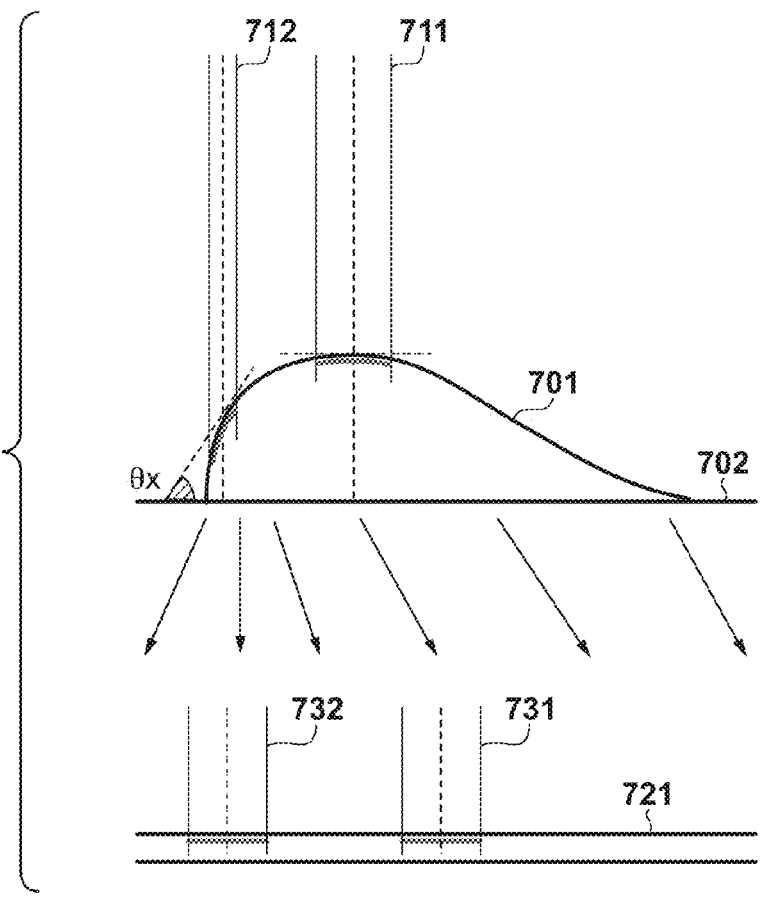
FIG. 7 is a diagram illustrating tilt in a document and a reference region.

FIG. 7 is a cross-sectional view expressing a relationship between tilt in the document and the corresponding reference region. 701 represents a booklet page, 702 represents the document platform, and 711 and 712 represent reference regions for the convolution operation. 721 represents a state in which distortion in the page 701 has been eliminated, and 731 and 732 represent corresponding reference regions for the convolution operation on the page 721. While the width of the region 711 is 2wx, the width of the region 712 is 2wx·cos θ, but it can be seen that when this is converted onto the page 721, the region 731 and the region 732 refer to regions having the same width. In other words, it can be seen that the same region, in terms of the content of the original document image, can be referred to by changing the breadth of the reference region in the captured image in accordance with the tilt.

The aforementioned Formula 9 is obtained by carrying out the convolution operation as indicated by Formula 13 in the y-axis direction, in the same manner as the calculation in the x-axis direction, for the tgtvalx obtained through Formula 12.

$$tgtval = \int_{-wy\cdot\cos\theta y}^{wy\cdot\cos\theta y} \mathrm{sinc}y(fy\cdot u)\cdot tgtvalx(u)du \quad \text{(Formula 13)}$$

In step 206, the loop transits to the next pixel of interest. In the case where the processing has been completed for all pixels in the post-correction image, the process ends. Note that in the case where the distortion is local, the area of the image in which the distortion is to be corrected may be subject to the correction processing.

In this manner, according to the present embodiment, the target region is narrowed in accordance with tilt of the document relative to the document platform during the convolution operation, and thus the same region in terms of the page content in the original document is referred to as a result. Through this, the reference region for the convolution operation is prevented from becoming non-uniform within the plane of the captured image of a non-planar document, which makes it possible to maintain a uniform sharpness within the plane of the post-interpolation process image.

Figure 15:
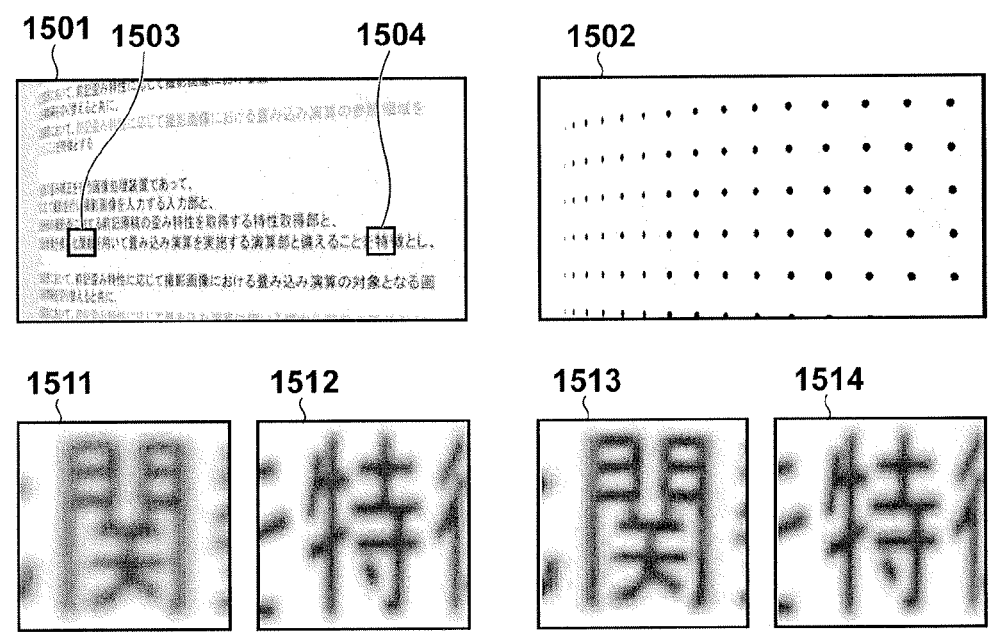
FIG. 15 is a diagram illustrating a result of applying the present invention.

FIG. 15 illustrates an effect of the present embodiment. 1501 represents a captured image of the document, and 1502 represents the distortion characteristics thereof. For a region 1503 in which the document has a tilt and a region 1503 in which the document has almost no tilt, 1511 and 1512 represent corresponding post-distortion correction process images in which the present invention is not applied, and 1513 and 1514 represent corresponding post-distortion correction process image in the case where the present invention is applied. Comparing the two, it can be seen that there is more uniformity in the post-distortion correction process sharpness in 1513 and 1514.

Figure 8:
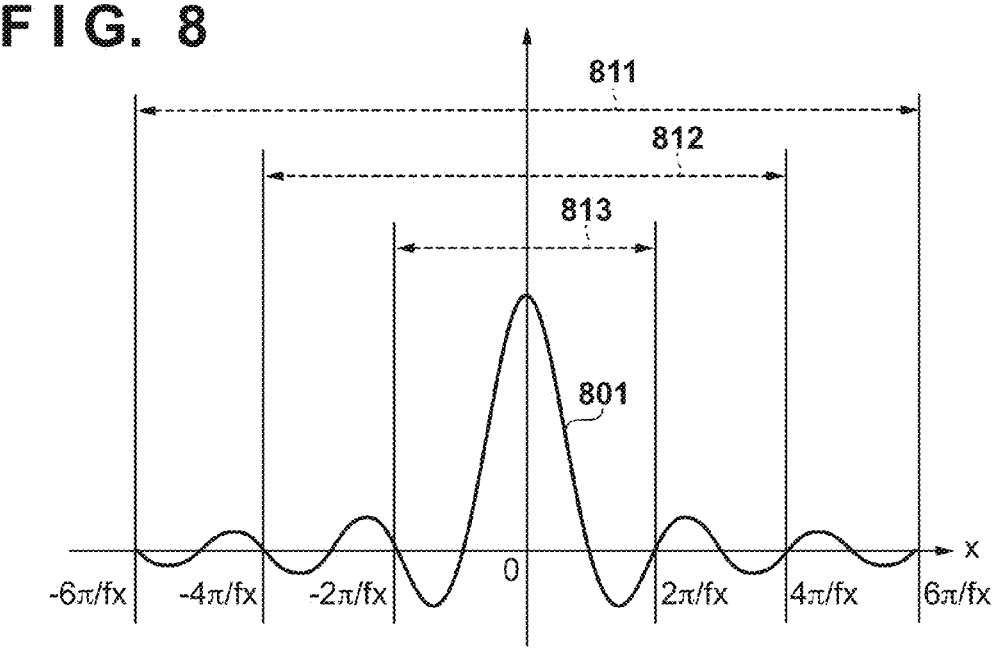
FIG. 8 is a diagram illustrating switching of the reference region.

Although the reference region is changed continuously in the present embodiment, it should be noted that the reference region may be changed discretely in accordance with the tilt in order to simplify the processing. In other words, the configuration may be such that for a sampling function 801 shown in FIG. 8, a region 811, a region 812, and a region 813 that correspond to periods of the sampling function may be switched for reference in accordance with constant tilt ranges as indicated in FIG. 9.

Because the image data to be corrected is configured of discrete pixels, the processing described in the present embodiment as integral expressions finds a sum of products in which, for all grid points in the reference region, values obtained by multiplying the pixel values in the original image located at each grid point with the values of the sampling function corresponding to the locations of those grid points have been integrated. To rephrase, the value of the pixel of interest to be interpolated is found from a weighted average of the pixel values of all grid points in the reference region in the periphery of the pixel of interest, and the weight thereof is given by the sampling function.

Second Embodiment

The first embodiment describes changing the reference region in accordance with tilt in the document in the convolution operation that is carried out using the sampling function. The second embodiment describes a configuration of a document reader provided with a distortion correction process that switches the frequency characteristics of the sampling function rather than varying the region.

A block diagram illustrating the configuration of the present embodiment is the same as in the first embodiment, and thus follows FIG. 1. Furthermore, the flow of operations is the same as in the first embodiment, and thus follows FIG. 2. The second embodiment differs from the first embodiment in that in step 205, the frequency characteristics are switched in accordance with the tilt of the document when the convolution operation is carried out. In other words, a calculation using Formula 14 is carried out as a calculation in place of Formula 9 from the first embodiment.

$$tgtval = \int_{-wy}^{wy} \mathrm{sinc}y(fy\cdot u/\cos\theta y)\cdot \quad \text{(Formula 14)}$$
$$\left(\int_{-wx}^{wx} \mathrm{sinc}x(fx\cdot t/\cos\theta x)\cdot pxlval(t,u)dt\right)du$$

FIG. 10 is a diagram in which the convolution operation has been limited to one dimension, namely an x-axis component, for descriptive purposes, as in the first embodiment. Extracting only a convolution operation for the x component results in Formula 15.

$$tgtvalx(y) = \int_{-wx}^{wx} \mathrm{sinc}x(fx\cdot t/\cos\theta x)\cdot pxlval(t,y)dt \quad \text{(Formula 15)}$$

What should be focused on here is that the argument of the sampling function sin cx used in the convolution operation is being divided by the cos θx obtained from the tilt of the document. That is, if the region is one in which the document is parallel to the document platform (perpendicular to the camera's optical system), such as the region 513, a sampling function 1001 having frequency characteristics as per the constant is used, whereas when there is a tilt, a sampling function 1002 having a high frequency is used.

Figures 11, 12:
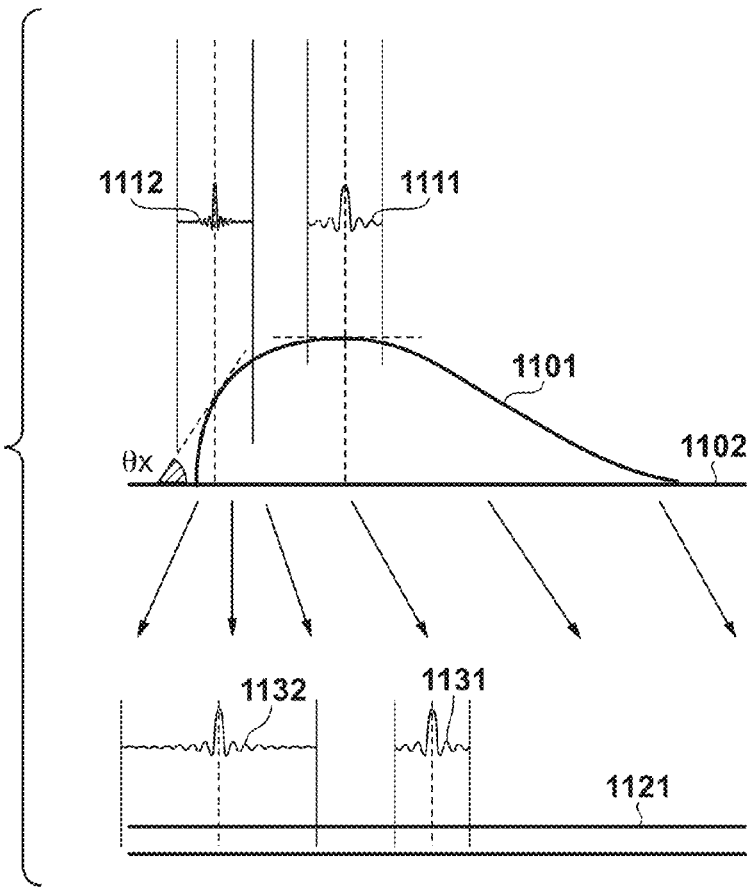
FIG. 11 is a diagram illustrating tilt in a document and frequency characteristics.
FIG. 12 is a diagram illustrating an example of discrete switching of frequency characteristics.

FIG. 11 is a cross-sectional view expressing a relationship between tilt in the document and the corresponding reference region. A page 1101 of a booklet is placed on a document platform 1102. Sampling functions 1111 and 1112 represent sampling functions used in the convolution operation. Meanwhile, a state 1121 represents a state in which distortion has been eliminated from the page 1101, and sampling functions 1131 and 1132 are sampling functions corresponding to the page 1121. A single period in the sampling function 1111 is wx/3, and a single period in the sampling function 1112 is wx/6, and it can be seen that when converted onto the page 1121, the sampling function 1131 and the sampling function 1132 are sampling functions having the same frequency characteristics. In other words, it can be seen that the same frequency characteristics as for the content of the original document can be applied by changing the frequency characteristics of the sampling function in the captured image in accordance with the tilt. In this manner, the frequency characteristics are changed in accordance with a length ratio between the projection of the reference region, tilted in accordance with the tilt in the document, onto the focal plane and the reference region, in the direction of interpolation, or in other words, in accordance with the cosine value.

The aforementioned Formula 14 is obtained by carrying out the convolution operation in the y-axis direction, in the same manner as the calculation in the x-axis direction, for the tgtvalx obtained through Formula 15.

In this manner, according to the present embodiment, a sampling function having frequency characteristics that are relatively the same as the content of the page in the original document is used during the convolution operation by increasing the frequency of the frequency characteristics of the sampling function that is used in accordance with the tilt of the document relative to the document platform. Through this, the reference region for the convolution operation is prevented from becoming non-uniform within the plane of the captured image of a non-planar document, which makes it possible to maintain a uniform sharpness within the plane of the post-interpolation process image.

Although the frequency characteristics are changed continuously in the present embodiment, it should be noted that the frequency characteristics may be changed discretely in accordance with the tilt in order to simplify the processing. In other words, the configuration may be such that the frequency characteristics of the sampling function are switched discretely in accordance with a constant tilt range, as indicated in FIG. 12.

Third Embodiment

In the convolution operation carried out using the sampling function, the first embodiment describes changing the reference region thereof in accordance with the tilt of the document, and the second embodiment describes changing the frequency characteristics of the sampling function in accordance with the tilt of the document. The third embodiment describes a document reader provided with a distortion correction process that carries out both of these processes.

A block diagram illustrating the configuration of the present embodiment and an operational flowchart are the same as in the first embodiment and the second embodiment, and thus follow FIG. 1 and FIG. 2.

The third embodiment differs from the first embodiment and the second embodiment in that in step 205, both the reference region and the frequency characteristics are switched in accordance with the tilt of the document when the convolution operation is carried out. In other words, a calculation using Formula 16 is carried out as a calculation in place of Formula 9 from the first embodiment and Formula 14 from the second embodiment.

$$tgtval = \int_{-wy \cdot \cos\theta y}^{wy \cdot \cos\theta y} \mathrm{sinc} y(fy \cdot u / \cos\theta y) \cdot \left( \int_{-wx \cdot \cos\theta x}^{wx \cdot \cos\theta x} \mathrm{sinc} x(fx \cdot t / \cos\theta x) \cdot pxlval(t, u) dt \right) du \quad \text{(Formula 16)}$$

Figure 13:
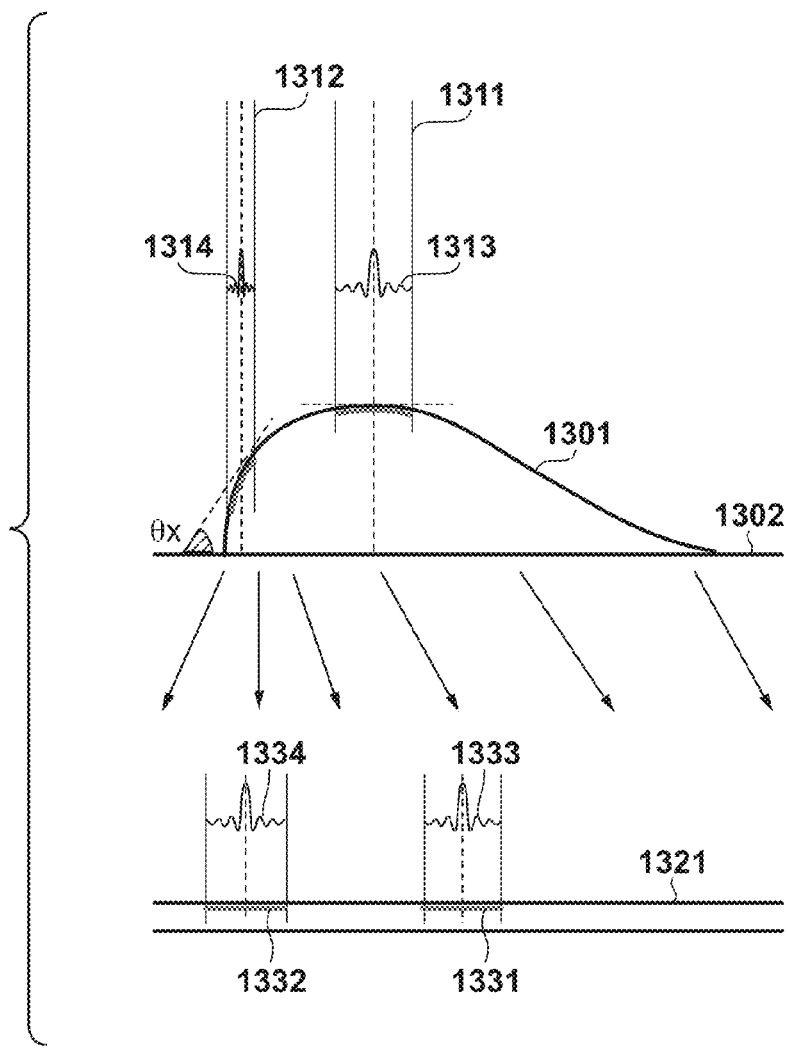
FIG. 13 is a diagram illustrating tilt in a document and a reference region/frequency characteristics.

FIG. 13 is a cross-sectional view of an x-axis component expressing a relationship between tilt in the document and the corresponding reference region. A page 1301 of a booklet is placed on a document platform 1302. Region widths 1311 and 1312 represent region widths referred to in the convolution operation, and sampling functions 1313 and 1314 represent sampling functions used in the convolution operation. Meanwhile, a page 1321 represents a state in which distortion has been eliminated from the page 1301, reference region widths 1331 and 1332 represent the widths of corresponding reference regions on the page 1321, and sampling functions 1333 and 1334 are corresponding sampling functions for the page 1321. From this diagram, it can be seen that the same reference regions and the same frequency characteristics as for the content of the original document can be applied by changing the reference region for the convolution operation and the frequency characteristics of the sampling function in the captured image in accordance with the tilt. This is realized by changing the reference region width in the same manner as in the first embodiment and changing the frequency characteristics of the sampling function in the same manner as in the second embodiment, in accordance with tilt of the document at the location of the pixel of interest.

In this manner, according to the present embodiment, a sampling function having the same frequency characteristics for the same relative reference region for the content of the page in the original document is used during the convolution operation by increasing the region referred to and the frequency of the frequency characteristics of the sampling function that is used in accordance with the tilt of the document relative to the document platform. Through this, the reference region for the convolution operation is prevented from becoming non-uniform within the plane of the captured image of a non-planar document more effectively than in the first embodiment and the second embodiment, which makes it possible to maintain a uniform sharpness within the plane of the post-interpolation process image.

Fourth Embodiment

The fourth embodiment describes a configuration of a document reader provided with a distortion correction process that achieves the same effects as the first embodiment to the third embodiment using a different approach from the methods described therein. A block diagram illustrating the configuration of the present embodiment is the same as in the first embodiment, and thus follows FIG. 1.

Figure 14:
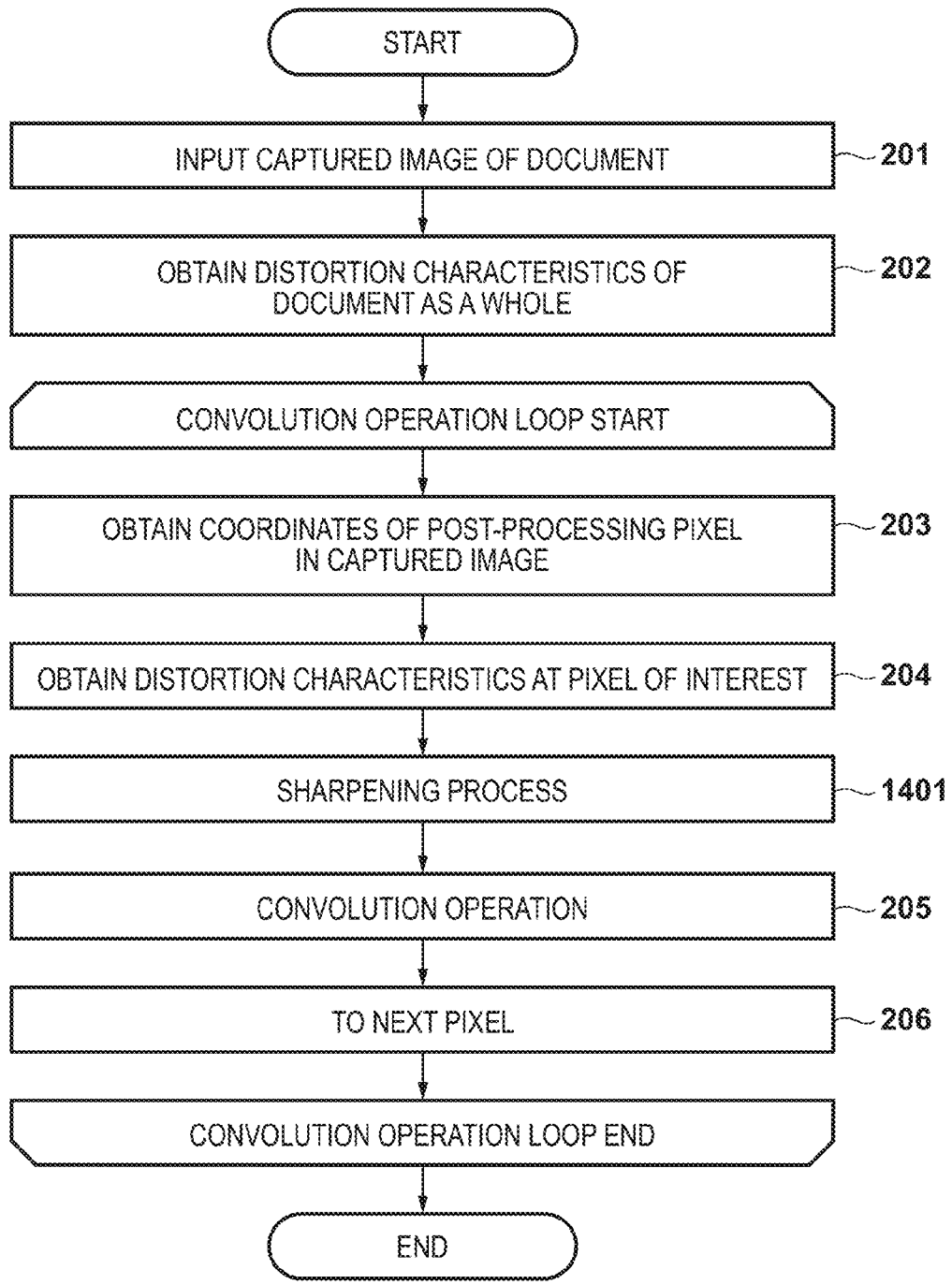
FIG. 14 is an operational flow according to a third embodiment.

FIG. 14 illustrates an operational flowchart according to the present embodiment. The characteristic part of this operational flowchart is that step 1401, which carries out a sharpening process, has been added. The other steps are the same as in FIG. 2. In other words, in the case where there is a large tilt in the document relative to the document platform, a sharpening filtering process is carried out with a strong gain, whereas in the case where there is no tilt (that is, the case where the document is perpendicular to the optical axis of the camera's optical system), a flat filter is used and no sharpening is carried out. Through this, effects similar to those in the first to third embodiments can be achieved. The filter selection may be carried out by, for example, comparing the tilt at the location of the pixel of interest with a predetermined threshold, and using a high-gain filter prepared in advance in the case where the tilt is greater than the threshold, and using a low-gain filter prepared in advance in the case where the tilt is less than or equal to the threshold.

Here, the sharpening filtering process of step 1401 and the convolution operation of step 205 are executed in that order because if the order is reversed, the mapping of the filter strength within the plane will not match the mapping of the distortion characteristics. In other words, in this case, it is necessary to carry out the distortion correction process on the distortion characteristics as well, which greatly increases the processing burden. The present embodiment provides a configuration that prevents this.

The first embodiment to the fourth embodiment all describe techniques related to interpolation processes involved in distortion correction processes for non-planar documents. However, the present invention is not limited thereto, and can also be applied in processes including interpolation processing for calculating pixel values of non-integer pixels in an input image, such as upconverting processes, magnification processes, trapezoidal distortion correction, distortion aberration correction, chromatic aberration correction, super-resolution processing, and so on.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-043156 filed Mar. 5, 2014, which is hereby incorporated by reference herein in its entirety.

What is claimed is:

1. An image processing apparatus that processes image data configured of pixels disposed in grid form, the apparatus comprising:
    an obtaining unit that obtains distortion characteristics indicating characteristics of distortion in a target contained in original image data obtained by capturing an image of the target; and
    a correction unit that, using a sampling function, interpolates a pixel of interest in the original image data, based on pixels of the original image data present in a reference region in the periphery of the location of the pixel of interest,
    wherein the correction unit changes the range of the reference region, the frequency characteristics of the sampling function, or both in accordance with the distortion characteristics, and
    wherein the correction unit specifies a tilt of the target relative to a focal plane at the location of the pixel of interest based on the distortion characteristics, and changes the range of the reference region, the frequency characteristics of the sampling function, or both in accordance with the specified tilt.

2. The image processing apparatus according to claim 1, wherein the correction unit takes, as the changed range of the reference region, a projection of the reference region tilted in accordance with the tilt onto the focal plane.

3. The image processing apparatus according to claim 1, wherein the correction unit changes the frequency characteristics in accordance with a ratio between the reference region and a projection of the reference region tilted in accordance with the tilt onto the focal plane.

4. The image processing apparatus according to claim 1, wherein the correction unit changes the range of the reference region, the frequency characteristics of the sampling function, or both in accordance with a range to which the tilt belongs.

5. The image processing apparatus according to claim 1, wherein the obtaining unit obtains distortion characteristics selected from among distortion characteristics prepared in advance.

6. The image processing apparatus according to claim 1, further comprising:
    an image capturing unit that captures the image of the target,
    wherein the distortion characteristics are produced by a tilt in the target relative to a focal plane of the image capturing unit.

7. The image processing apparatus according to claim 6, wherein the distortion characteristics are produced by distortion in an optical system present in the image capturing unit.

8. The image processing apparatus according to claim 1, wherein the correction unit carries out sharpening on the original image data at a gain based on the tilt prior to interpolating the pixel of interest.

9. A non-transitory computer-readable medium on which is recorded a program for causing a computer to function as the image processing apparatus that processes image data configured of pixels disposed in grid form, comprising:
    an obtaining unit that obtains distortion characteristics indicating characteristics of distortion in a target contained in original image data obtained by capturing an image of the target; and
    a correction unit that, using a sampling function, interpolates a pixel of interest in the original image data, based on pixels of the original image data present in a reference region in the periphery of the location of the pixel of interest,
    wherein the correction unit changes the range of the reference region, the frequency characteristics of the sampling function, or both in accordance with the distortion characteristics, and
    wherein the correction unit specifies a tilt of the target relative to a focal plane at the location of the pixel of interest based on the distortion characteristics, and changes the range of the reference region, the frequency characteristics of the sampling function, or both in accordance with the specified tilt.

10. An image processing method that processes image data configured of pixels disposed at grid points, the method comprising:
    an obtaining step of obtaining distortion characteristics indicating characteristics of distortion in a target contained in original image data obtained by capturing an image of the target; and
    a correction step of interpolating, using a sampling function, a pixel of interest in the original image data, based on pixels of the original image data present in a reference region in the periphery of the location of the pixel of interest,
    wherein in the correction step, the range of the reference region, the frequency characteristics of the sampling function, or both are changed in accordance with the distortion characteristics, and wherein the correction step specifies a tilt of the target relative to a focal plane at the location of the pixel of interest based on the distortion characteristics, and changes the range of the reference region, the frequency characteristics of the sampling function, or both in accordance with the specified tilt.

\* \* \* \* \*